United States Patent
Hopkins (10) Patent No.: US 9,565,057 B1
(45) Date of Patent: Feb. 7, 2017

(54) SYSTEM AND METHOD FOR UTILIZING A FONT DATA CONTAINER TO STORE A DEVICE IDENTIFIER

(71) Applicant: Twitter, Inc., San Francisco, CA (US)

(72) Inventor: Peter W. Hopkins, Cambridge, MA (US)

(73) Assignee: Twitter, Inc., San Francisco, CA (US)

( * ) Notice: Subject to any disclaimer, the term of this patent is extended or adjusted under 35 U.S.C. 154(b) by 101 days.

(21) Appl. No.: 14/297,930

(22) Filed: Jun. 6, 2014

(51) Int. Cl.
*G06F 15/16* (2006.01)
*H04L 12/24* (2006.01)

(52) U.S. Cl.
CPC ................................ *H04L 41/0806* (2013.01)

(58) Field of Classification Search
None
See application file for complete search history.

(56) References Cited

U.S. PATENT DOCUMENTS

| | | | |
|---|---|---|---|
| 7,305,671 B2 * | 12/2007 | Davidov | G06F 8/30 717/108 |
| 8,972,947 B2 * | 3/2015 | Orr | G06F 11/3664 707/756 |
| 2004/0044993 A1 * | 3/2004 | Muller | G06F 11/3664 717/124 |
| 2012/0278194 A1 * | 11/2012 | Dewan | G06F 11/0784 705/26.1 |
| 2013/0152050 A1 | 6/2013 | Chang et al. | |
| 2014/0033183 A1 * | 1/2014 | Brown | G06F 11/3636 717/131 |

OTHER PUBLICATIONS https://iostipsntricks.wordpress.com/2011/05/19/error-reporting-in-your-ios-apps/. Posted May 19, 2011.*

* cited by examiner

*Primary Examiner* — Scott B Christensen
(74) *Attorney, Agent, or Firm* — Cesari and McKenna, LLP (57) ABSTRACT

A system and method for utilizing an attribute data container, e.g., a font file, to store a device identifier is provided. During a mobile configuration procedure, an analytic processing server generates a unique identifier to be used in identifying a particular end user device. This unique identifier is embedded into an attribute data container that is then stored on the end-user device. An application, executing on the end-user device, may load the attribute data container to determine the unique identifier associated with the end user device.

18 Claims, 6 Drawing Sheets

SYSTEM AND METHOD FOR UTILIZING A FONT DATA CONTAINER TO STORE A DEVICE IDENTIFIER

BACKGROUND INFORMATION

Developers of applications for use on mobile devices, such as cellular telephones, smartphones and/or tablets, typically have a period of beta testing prior to the application being released to the general public. The beta testing period comprises a limited distribution of the application to certain customers who utilize the application and provide feedback on its performance, etc. More generally, the beta testing process enables utilization of the application in a real-world environment outside of the developer's own controlled lab. A noted problem arises in that should the application experience an error condition and desire to report information relating to the error back to the application developer, the application may be limited as to determining which device it is executing on and/or who is using that particular device. For example, in certain mobile operating systems, it is not possible to directly identify a unique device identifier (such as a UDID) associated with the end user device through the mobile operating system.

One workaround is to direct to the user of the application to a website to complete a registration process including entering user and device related information. However, this registration process requires additional steps and causes a burden on the user.

SUMMARY OF THE INVENTION

The present invention relates generally to application debugging and more particularly to storing device related information in an attribute data container that may illustratively be implemented as a font data container (e.g., a font file, that may be utilized by an application to identify the end user device). In one aspect, the invention relates to a procedure for registering a device using a mobile configuration process. The mobile configuration process, executing on an analytic processing server, first generates a unique identifier for the particular end user device. The mobile configuration process then generates an attribute data container that stores the unique identifier. Illustratively, the unique identifier is stored in a special table of a True Type font file; however, alternative attribute data container types may be utilized in accordance with alternative embodiments. The mobile configuration process also generates an entry in an identifier mapping data structure that provides a mapping between the unique identifier stored in the attribute data container and a device identifier and/or user identifier associated with the particular end user device. The attribute data container is then downloaded to the device as part of the mobile configuration registration. An application executing on the device may examine the attribute data container to determine the device identifier of the device on which it is executing. The application may then utilize the device identifier in various reporting functions that may be useful to the application developer for debugging and/or quality control purposes.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

A computer network is a geographically distributed collection of entities interconnected by communication links and segments for transporting data between end nodes, such as personal computers, workstations, mobile devices etc. Many types of networks are available, ranging from Wi-Fi networks, cellular telephone networks, local area networks (LANs) to wide area networks (WANs). Wi-Fi is a mechanism for wirelessly connecting a plurality of electronic devices (e.g. computers, cell phones, etc.). A device enabled with Wi-Fi capabilities may connect to the Internet via a wireless network access point, as known to those skilled in the art. Cellular networks are radio networks distributed over large areas called "cells", wherein each cell may be served at least one fixed-location transceiver known as a cell site or base station. When joined together, these cells may provide radio coverage over a wide geographic area. As known by those skilled in the art, this may enable a large number of portable transceivers (e.g., mobile phones), to communicate with each other. LANs typically connect the entities over dedicated communication links located in the same general physical location, such as a building or a campus. WANs, on the other hand, typically connect geographically dispersed entities for long-distance communication links, such as common carrier telephone lines, optical light paths, synchronous optical network (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as Transmission Control Protocol/Internet Protocol TCP/IP, Hypertext Transfer Protocol (HTTP), etc. In this context, a protocol consists of a set of rules defining how the entities interact with each other and how packets and messages are exchanged.

Figure 1:
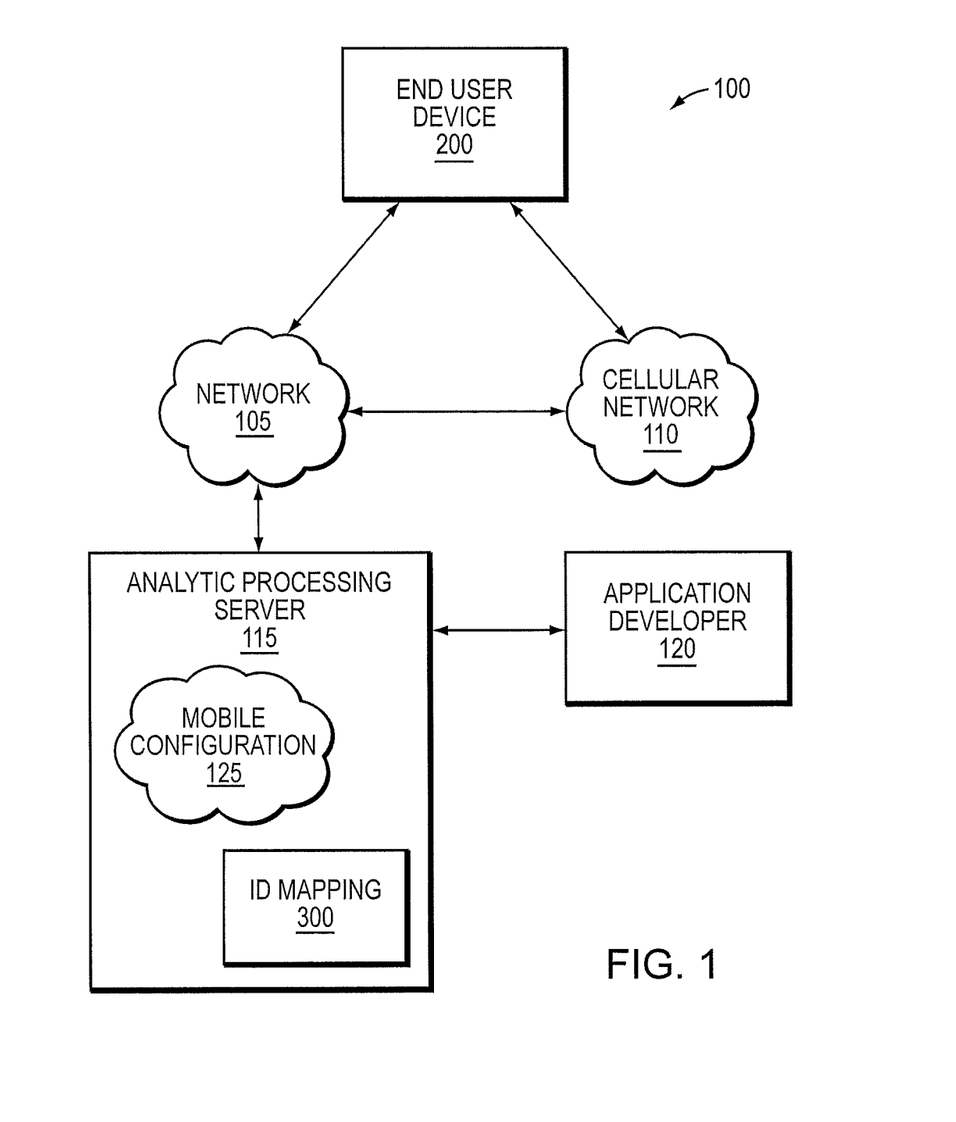
FIG. 1 is a schematic block diagram of an exemplary computing environment in accordance with an illustrative embodiment of the present invention.

FIG. 1 is a schematic block diagram of an exemplary computing environment 100 in accordance with an illustrative embodiment of the present invention. Computing environment 100 is centered around a network 105 that is illustratively operatively interconnected with a cellular network 110. An end-user device 200, described further below in reference to FIG. 2, may comprise a cellular telephone, a tablet or other mobile device. More generally, the end-user device 200 may comprise any computing platform in which the principles of the present invention may be implemented. As such, the description of end-user device 200 being a mobile device should be taken as exemplary only. Also operatively interconnected with the network 105 is an analytic processing server 115. The analytic processing server 115 may be further operatively interconnected with an application developer 120. The analytic processing server 115 may comprise the functionality to examine collected crash or state information from applications for the purpose of debugging. The analytic processing server 115 may be configured to receive such information by incorporating analytic code into an application developed by an application developer 120. One example of an analytic processing server 115 is described in United States Patent Publication No. 2013/0152050 A1, published on Jun. 13, 2013 entitled SYSTEM AND METHOD FOR DATA COLLECTION AND ANALYSIS OF INFORMATION RELATING TO MOBILE APPLICATIONS, the contents of which are hereby incorporated by reference.

Executing within the analytic processing server 115 is a mobile configuration process 125. The mobile configuration process 125 may perform a conventional mobile configuration procedure 500 described further below in reference to FIG. 5, as will be appreciated by those skilled in the art to register an application with the analytic processing server. The mobile configuration process 125 may be illustratively implemented as the Apple Configurator Tool available from Apple, Inc. However, it should be noted that in alternative embodiments, the mobile configuration process 125 may be implemented in other applications. As such, the description contained herein should be taken as exemplary only. The analytic processing server also maintains an identifier (ID) mapping data structure 300, described further below with reference to FIG. 3. Generally, the ID mapping data structure 300 stores a mapping between a unique identifier that is generated by the mobile configuration process 125, and information that identifies a particular user on a particular mobile device.

Figure 2:
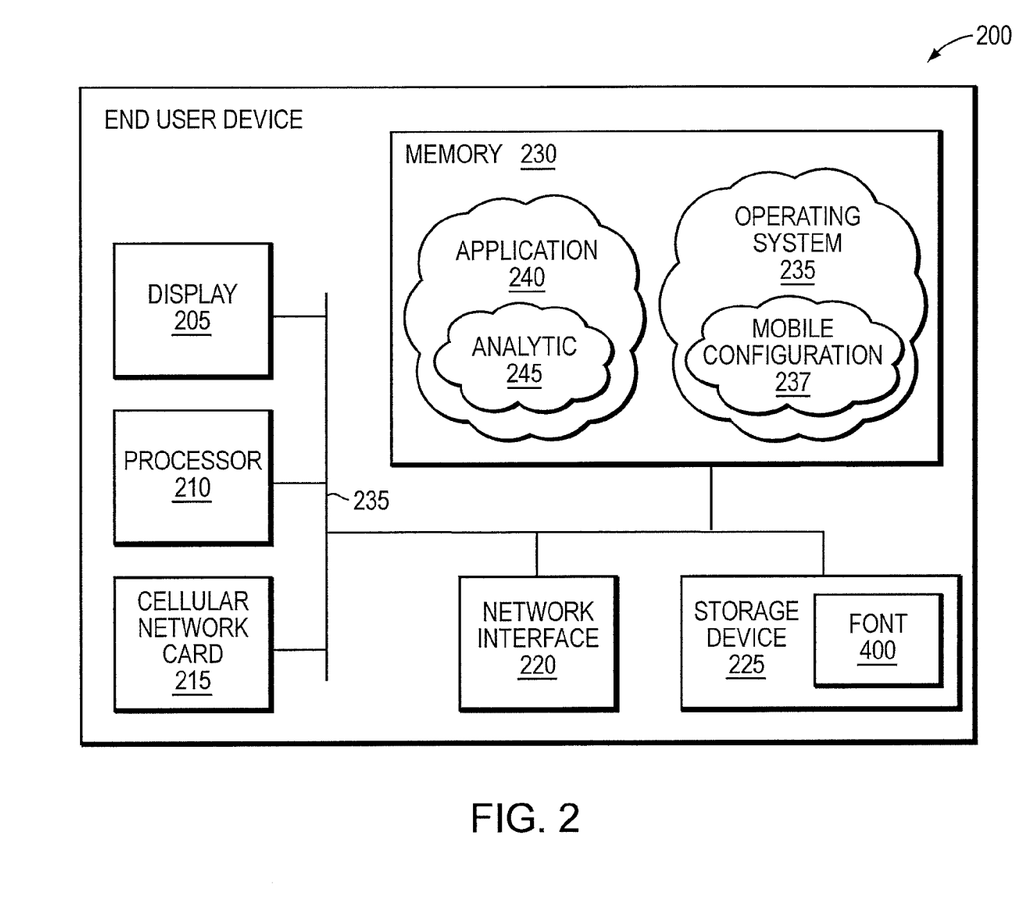
FIG. 2 is a schematic block diagram of an exemplary end-user device in accordance with an illustrative embodiment of the present invention.

FIG. 2 is a schematic block diagram of an exemplary end user device 200 in which the principles of the present invention may be implemented in accordance with an illustrative embodiment of the present invention. The end user device 200 illustratively comprises a mobile device such as, e.g., a cellular telephone, tablet computer, etc. However, it should be noted that in alternative embodiments of the present invention, the end-user device may comprise a non-mobile computing device such as a desktop computer, etc. As such, while this description is written in terms of the end-user device 200 comprising a mobile device, it should be noted that such description is exemplary only.

The end-user device 200 illustratively comprises a display 205, a processor 210, a cellular network card 215, a network interface 220, a storage device 225 and a memory 230 interconnected by a network bus 235. Display 205 illustratively comprises a touchscreen that enables a user to view applications as well as provide input for applications executing on the end-user device 200. The processor 210 may comprise the necessary elements and/or logic adapted to execute software programs and manipulate data structures. In alternative embodiments, processor 210 may comprise of a plurality of separate processors dedicated to particular functions. As such, the description of a single processor 210 should be taken as exemplary only.

The cellular network card 215 and the network interface 220 illustratively contain the mechanical, electrical and signaling circuitry for transmitting/receiving data over a cellular network and/or Wi-Fi network. The cellular network interface 215 and network interface 220 configured to transmit and/or receive data using a variety of different communication protocols, including, inter alia, TCP/IP, UDP, ATM, SONET, HTTP, wireless protocols such as 802.11, frame relay, Ethernet Fiber Distributed Data Interface (FDDI), etc. Notably, the network interface 140 may also be used to implement one or more virtual network interfaces, such as for virtual private network (VPN) access, as is known to those skilled in the art.

Figure 4:
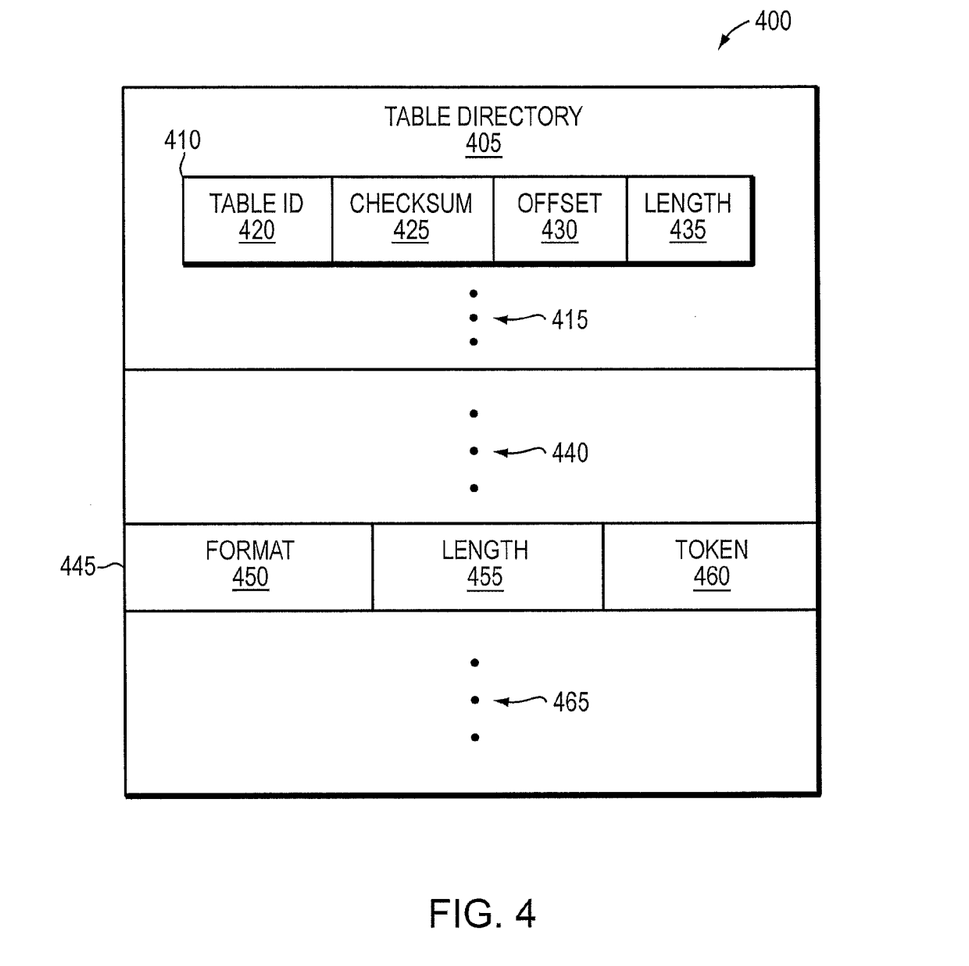
FIG. 4 is a schematic block diagram of an exemplary attribute data container in accordance with an illustrative embodiment of the present invention.

The storage device 225 may comprise any form of storage adaptable for use in an end-user device. Examples of storage devices may comprise, micro hard disks, removable media, such as memory stick, Flash RAM, etc. The attribute data structure 400, described further below in reference to FIG. 4, is illustratively a True Type font data structure defining a font for use by an application 240. Illustratively, the attribute data structure 400 includes attribute information relating to the unique identifier that is utilized by the analytic service provider in identifying a particular end-user device 200 in accordance with an illustrative embodiment of the present invention. It should be noted that while attribute data container 400 is shown as being stored in storage device 225, in alternative embodiments the attribute data container 400 may be stored within memory 230. As such, the description of attribute data container 400 being stored within storage device 225 should be taken as exemplary only.

The operating system 235 may comprise a mobile operating system such as the Android operating system available from Google, Inc., the iOS operating system available from Apple, Inc., etc. The operating system 235 may illustratively comprise a mobile configuration module 237. The mobile configuration module 237 may cooperate with the mobile configuration module 125 executing on the analytic processing server 115, described above in reference to FIG. 1, to implement the mobile configuration process. Further, the mobile configuration module 237 may manage the downloading of an attribute data container, such as an exemplary font data file 400.

Exemplary application 240 is stored within memory 230 of the end-user device 200 and is executed by processor 210. Illustratively, the application 240 may comprise an analytic module 245. The analytic module 245, which may be installed as a component of or in association with the application 240, is illustratively operatively configured to cause the application to provide certain feedback and/or reporting information to an analytic processing server in accordance with an illustrative embodiment of the present invention. Further, the analytic module 245 may be configured to examine the attribute data container 400 upon initialization of the application 240 to determine the identifier associated with the end-user device 200.

Figure 3:
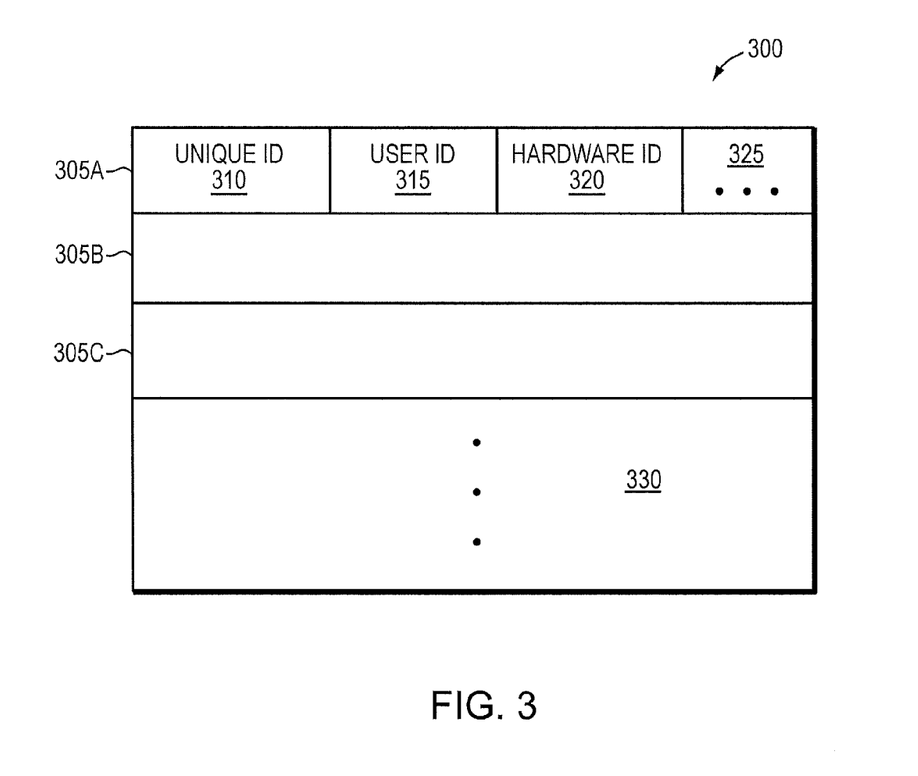
FIG. 3 is a block diagram of an exemplary device identifier mapping data structure in accordance with an illustrative embodiment of the present invention.
Figure 5:
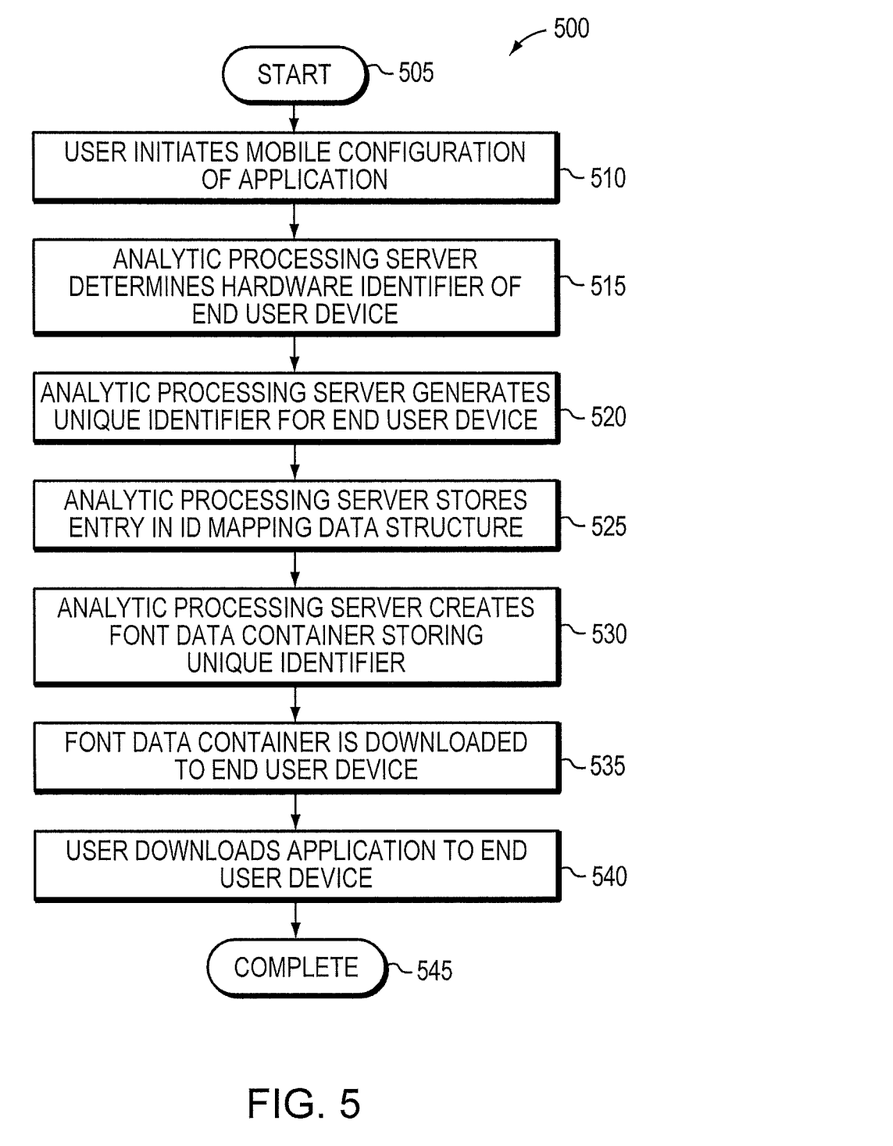
FIG. 5 is a flowchart detailing the steps of a procedure for installing an attribute data container containing a device identifier on an end user device in accordance with an illustrative embodiment of the present invention.

FIG. 3 is a block diagram of an exemplary identifier (ID) mapping data container 300 in accordance with an illustrative embodiment of the present invention. The ID data container 300 comprises of a plurality of entries 305 A-C. Exemplary entry 305A comprises a unique identifier field 310, a user identifier field 315, a device identifier field 320 and, in alternative embodiments, additional fields 330. Illustratively, the unique identifier field 310 stores a unique identifier value that is generated by the mobile configuration procedure 500, described further below in reference to FIG.

5. This unique identifier is stored within the font data container that is then downloaded to the end user device. Illustratively, the unique identifier is randomly generated by the mobile configuration process. As the unique identifier is the only data from entry 305 that is transmitted outside of the analytic processing server, privacy may be maintained. The user identifier field 315 illustratively stores an identifier of a particular user. Similarly, the device identifier field 320 stores an identifier of a particular end user device. Illustratively, the device identifier may comprise a hardware ID of the end user device or may comprise a customizable, i.e., modifiable, ID assigned to the device. The attribute information, e.g., the user identifier and device identifier, may be obtained during the mobile configuration process, described further below. That is, each entry 305 provides a mapping between the unique identifier 310 that is contained within an attribute data container downloaded to an end user device to the user identifier 315 and device identifier 320 associated with a particular end-user device. In an alternative embodiment of the present invention, a user identifier 315 may not be stored. In an alternative embodiment, only the device identifier 320 is stored. The device identifier uniquely identifies a particular end user device, the entry thereby provides a mapping between the unique identifier that is available via the attribute data container and the device identifier 320.

FIG. 4 is a schematic block diagram of an exemplary attribute data container 400 in accordance with an illustrative embodiment of the present invention. Illustratively the attribute data container 400 comprises a True Type font data container. However, it should be noted that in alternative embodiments of the present invention, different types of attribute data containers may be utilized. As such, the description of a True Type font data container should be taken as exemplary only. Further, in such alternative embodiments, various fields, offsets, and data structures may vary to conform to the requirements of a particular attribute data container specification. As will be appreciated by those skilled in the art, the principles of the present invention may be modified based on the description contained herein to accommodate such variations in the attribute data container specification. The attribute data container 400 illustratively comprises of a table directory 405 having at least one entry 410 and, in alternative embodiments, additional entries 415. Each entry 410 contains a plurality of fields including, for example, a table identifier field 420, a checksum field 425, and offset field 430 and a length field 435. Illustratively, the table identifier field 420 comprises a four byte field. However, it should be noted that in alternative embodiments of the present invention any appropriate table identifier 420 may be utilized. Further, in alternative embodiments of the present invention, the table identifier may comprise a field of differing length. As such, the description of a four byte table identifier 420 should be taken as exemplary only. The checksum field 425 is illustratively a four byte checksum field that comprises a checksum of the entry including, for example, the table identifier, offset and length fields. The offset field 430 illustratively comprises a four byte field identifies an offset into the attribute data container 400 where the table identified by the table identifier 420 begins. The length field 435 identifies a length of the table identified by the table identifier field 420. As will be appreciated by those skilled in the art, in alternative embodiments additional fields (not shown) may comprise part of entry 410. Further, in alternative embodiments the various fields of entry 410 may be in a differing order or may not appear. Thus, for example, in an alternative embodiment, a checksum field 425 may not be part of entry 410.

The attribute data container 400 comprises a plurality of tables 440, 465 in addition to illustrative table 445 that is utilized to store the unique identifier in accordance with an illustrative embodiment of the present invention. The table 445 illustratively comprises the format field 450, a length field 455 and a token field 460. The format field 450 contains one or more bytes identifying a format of the table. In an illustrative embodiment of the present invention, the format field 450 comprises a four byte field. In a first embodiment of the present invention, the format field of 450 may store a value of one. In accordance with alternative embodiments of the present invention, should the structure of the table 445 change, the format field 450 may vary to enable applications accessing the attribute data container 400 to determine how to properly interpret the table 445. The length field 455 illustratively comprises a four byte field identifies the length of the token field 460. The token field 460 illustratively comprises of a 24 byte ASCII encoded value representing the unique identifier. As will be appreciated by those skilled in the art, the various lengths described herein should be taken as exemplary only. It is expressly contemplated that in accordance with alternative embodiments of the present invention, the various lengths and/or organization of entries 410 and/or table 445 may vary without departing from the spirit or scope of the present invention.

FIG. 5 is a flowchart detailing the steps of a procedure 500 for installing an attribute data container in an end user device in accordance with an illustrative embodiment of the present invention. The procedure 500 begins in step 505 continues to step 510 where the user initiates a mobile configuration of the application. The mobile configuration of the application may be automatically initiated as a result of a user initiating a download of an application in accordance with an illustrative embodiment of the present invention. That is, the initiation of the mobile configuration of the application may be configured to coincide with the downloading of the application to the end user device. As such, the description of a separate initiation step should be taken as exemplary only. Alternatively, the OS 235 of the end user device 200 may initiate the mobile configuration process by, e.g., sending a request to the analytic processing server to begin the mobile configuration process.

During the mobile configuration procedure, the analytic processing server determines the device identifier of the end user device in step 515. Illustratively, the device identifier of the end user device is provided to the mobile configuration process through conventional system calls. However, in alternative embodiments, the analytic processing server may need to perform specialized functions to identify the device identifier of the end user device. Illustratively, the mobile configuration process 125, executing on the analytic processing server 115, obtains the hardware and/or user identifiers via conventional system calls. In one example, the device identifier is available via system calls during execution of a mobile configuration process. As such, the mobile configuration process 125 is able to directly obtain the device identifier. The user identifier may be obtained by, for example, the user of the end-user device registering for the mobile configuration procedure.

The analytic processing server then generates a unique identifier for the end user device in step 520. In accordance with an illustrative embodiment of the present invention, the unique identifier for the end user device comprises the output of a random number generator. The size of the random number may vary depending upon design implementations and/or constraints in accordance with various embodiments. As it is possible (although unlikely) that a random number generator may generate the same random number in two separate occurrences, the analytic processing server will illustratively check the identifier mapping data structure 300 to ensure that be generated identifier has not been previously utilized. In an alternative embodiment of the present invention, the unique identifier may be a monotonically increasing value, i.e., a first end-user device registered within analytic processing server is assigned a unique identifier of 1, the second is assigned a unique identifier the value of 2, etc. More generally, the analytic processing server, through its mobile configuration process, generates a unique identifier for the particular hardware and user associated with the end-user device. As will be appreciated by those skilled in the art, as only the unique identifier is contained within the attribute data container stored on the end user device, should security be compromised and a hacker obtain the unique identifier value contained within the attribute data container, it is impossible to map between the unique identifier and the end-user device without access to the ID mapping data structure stored at the analytic processing server. In step 525, the analytic processing server stores an entry in the ID mapping data structure that provides a mapping between the unique identifier and the hardware ID/User ID for a particular end user device. That is, the analytic processing server illustratively generates a new entry 305 within an identifier mapping data structure 300 that stores a unique identifier, a user identifier and the device identifier. The analytic processing server then creates an attribute data container storing the unique identifier in step 530. Illustratively, the attribute data container that is created is a True Type font data container that contains the unique identifier in a special table 445 as described above in relation to FIG. 4. However, it should be noted that in alternative embodiments of the present invention, the attribute data container may comprise differing formats other than TrueType fonts. As such, the description contained herein of a True Type font data container should be taken as exemplary only. The attribute data container is then downloaded the end-user device in step 535. Illustratively, the attribute data container is downloaded as part of the mobile configuration procedure managed by the mobile configuration process. The attribute data container is illustratively downloaded to the end user device and stored within the storage device 225 of the end-user device 200. It should be noted that in alternative embodiments, the attribute data container may be stored in differing locations. As such, the description of the attribute data container being stored within the storage device 225 should be taken as exemplary only. The application is then downloaded to the end user device in step 540. Illustratively, a user downloads the application as part of a beta testing arrangement with the application developer. However, in alternative embodiments, a user may download the application in a non-testing environment. As such, the description of downloading the application as part of a beta testing environment should be taken as exemplary only. The procedure 500 then completes in step 545.

Figure 6:
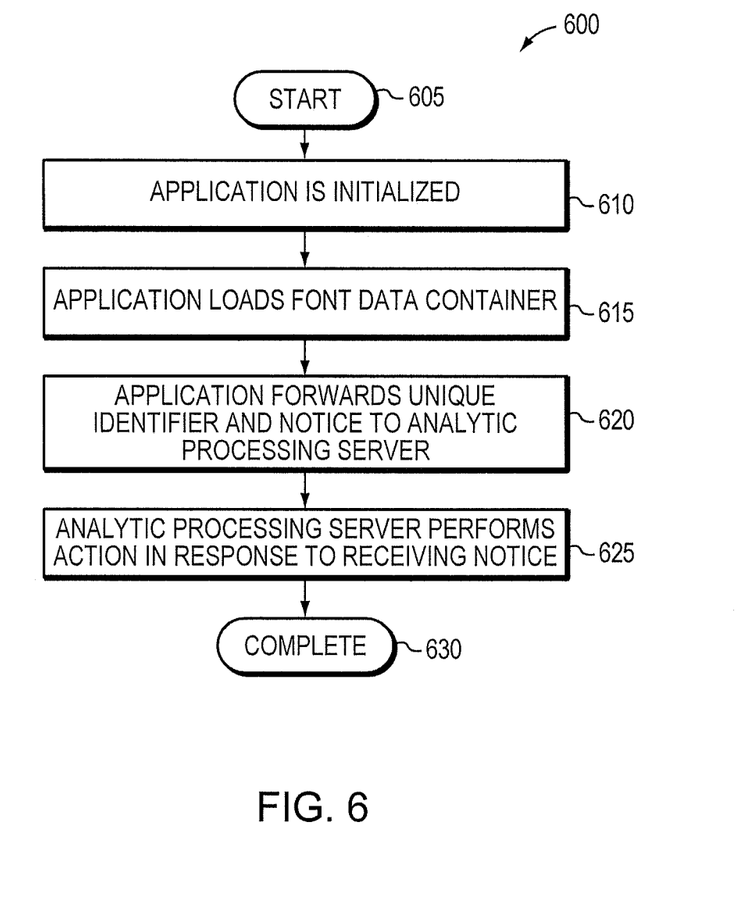
FIG. 6 is a flowchart detailing the steps of a procedure for utilizing an attribute data container storing a device identifier in accordance with an illustrative embodiment of the present invention.

FIG. 6 is a flowchart detailing the steps of a procedure 600 for utilizing the identifier stored in an attribute data container in accordance with an illustrative embodiment of the present invention. The procedure 600 begins in step 605 and continues to step 610 where the application is initialized. In accordance with an illustrative embodiment of the present invention, the application may be initialized by a user clicking on an icon associated with the application on the end-user device. Alternatively, an application may be initialized due to an action of a second application. For example, an application directed to playing videos may be launched by a web browser application in response to a user clicking on a link to a video. As will be fully appreciated by those skilled in the art, there are a variety of techniques for initializing an application on an end user device. As such, the description contained herein of a user clicking on an icon associated with an application should be taken as exemplary only. During the initialization process, the application loads the attribute data container in step 615. The application may illustratively load the attribute data container using conventional function calls associated with the operating system in accordance with an illustrative embodiment of the present invention. Illustratively, the analytic module 245 of the application 240 loads the attribute data container 400 to obtain the unique identifier. The application, by loading the attribute data container, obtains the unique identifiers associated with the end user device. This enables the application to utilize the unique identifier to associate messages with a particular end user device. In accordance with one illustrative embodiment of the present invention, the application may then forward the identifier and a notice to the analytic processing server in step 620. The notice may comprise any sort of message relating to operation of the application. In an illustrative embodiment of the present invention, the notice may comprise information that may be utilized by the application developer as part of the beta testing program. However, in alternative embodiments of the present invention, the notice may comprise any sort of message. As such, the description of the notice being diagnostic information relating to beta testing of the application should be taken as exemplary only. In response to receiving the notice, the analytic processing server platforms an action in response in step 625. Illustratively, the performed action may comprise logging the information for later use by the analytic processing server. In alternative embodiments, the analytic processing server may initiate an error correction protocol in response receiving certain notices. The procedure 600 then completes in step 630.

It should be noted that the various descriptions and embodiments described herein are exemplary only. The aspects of the invention may be implemented in software, such as a non-transitory computer readable medium, hardware, firmware or any combination thereof. For example, a non-transitory computer readable medium can be configured with instructions to perform one or more of the steps as described in relation to procedure hundred. Further, while this description is written in references to particular operating systems and/or end-user devices, one skilled in the art will appreciate that the functionality may be implemented and differing environments.

What is claimed is:

1. A system comprising:
   a computer processor;
   an analytic processing module executing on the computer processor configured to:
   receive a request to install a configuration profile on an end user device, the request including attribute information associated with the end user device;
   generate a unique identifier associated with the end user device, wherein the unique identifier is stored within an attribute data container; and
   provide the attribute data container to the end user device in response to the request, wherein the attribute data container is stored on the end user device in a portion of memory accessible to a user application installed on the end user device, wherein the user application is blocked by an operating system of the end user device from accessing at least a portion of the attribute information using a system call, and wherein the user application includes an analytic module configured to load the attribute data container to retrieve the unique identifier, and wherein the attribute data container is a font data container.

2. The system of claim 1 wherein a message is sent from the end user device to an analytic processing server wherein the message includes the unique identifier and information relating to an error condition associated with the user application.

3. The system of claim 2 wherein the analytic processing server is configured to use the unique identifier from within the message to identify the end user device.

4. The system of claim 1 wherein the attribute information includes a user identifier associated with a particular user and a device identifier associated with the end user device.

5. The system of claim 1 wherein the generated unique identifier is stored with the attribute information in an entry of an identifier mapping data structure.

6. The system of claim 1 wherein the operating system is iOS.

7. A method comprising:
receiving, by an analytic processing server, a request to install a configuration profile on an end user device;
obtaining, by the analytic processing server, attribute information associated with the end user device;
generating an attribute data container including a unique identifier associated with the end user device, wherein the attribute data container is a font data container;
storing, by the analytic processing server, the attribute data container having a reference to the unique identifier of the end user device;
providing, in response to the request, the attribute data container to the end user device for storage in a portion of memory accessible to a user application installed on the end user device, wherein the user application is blocked by an operating system of the end user device from accessing at least a portion of the attribute information using a system call.

8. The method of claim 7 further comprising:
transmitting, by an analytic module of the application, a message to the analytic processing server, wherein the message includes the unique identifier.

9. The method of claim 8 further comprising:
locating, within an identifier mapping data structure, an entry including the unique identifier; and
using the unique identifier to identify the end user device.

10. The method of claim 7 wherein generating the attribute data container comprises generating a plurality of tables, wherein the unique identifier is stored in one of the plurality of tables.

11. A client device comprising:
a computer processor;
a mobile configuration module executing on the computer processor to enable the computer processor to:
send, to an external server, a request to install a configuration profile on the client device, the request including attribute information associated with the client device;
receive an attribute data container at the client device in response to the request, wherein the attribute data container includes a unique identifier associated with the client device and generated by the external server, wherein the attribute data container is a font data container;
store the attribute data container on the client device in a portion of memory accessible to a user application installed on the client device, wherein the user application is blocked by an operating system of the client device from accessing at least a portion of the attribute information using a system call; and
an analytic module executing on the computer processor configured to:
load the attribute data container to retrieve the attribute information for the user application.

12. The method of claim 8 wherein the message relates to an error condition associated with the application.

13. The method of claim 7 wherein the attribute information includes a user identifier associated with a particular user and a device identifier associated with the end user device.

14. The client device of claim 11 further comprising
an analytic module executing on the computer processor, the analytic module configured to transmit a message to the external server, wherein the message includes the unique identifier.

15. The client device of claim 14 wherein the external server is configured to use the unique identifier within the message to identify the client device.

16. The client device of claim 13 wherein the unique identifier is stored with the attribute information at the external server in an entry of an identifier mapping table.

17. The client device of claim 11 wherein the client device is a mobile phone and the user application is a mobile application.

18. The client device of claim 14 wherein the message relates to an error condition associated with the application.

* * * * *